United States Patent [19]

Miyano et al.

[11] 3,932,200
[45] Jan. 13, 1976

[54] FLUX FOR A BUILD-UP WELDING

[75] Inventors: Katao Miyano; Shunichi Tomizuka; Takao Adachi, all of Muroran; Tomoo Takenouchi; Satoshi Kondo, both of Noboribetsu; Akira Hirama; Yasuo Endo, both of Muroran, all of Japan

[73] Assignee: Japan Steel Works, Ltd., Tokyo, Japan

[22] Filed: Jan. 31, 1974

[21] Appl. No.: 438,349

[30] Foreign Application Priority Data
June 19, 1973 Japan................ 48-68304

[52] U.S. Cl..................... 148/26; 219/73
[51] Int. Cl.².............. B23K 9/04; B23K 35/362
[58] Field of Search ............. 148/26; 219/73, 146

[56] References Cited
UNITED STATES PATENTS

| | | | |
|---|---|---|---|
| 3,320,100 | 5/1967 | Coless | 148/26 |
| 3,340,103 | 9/1967 | Ballass et al. | 148/26 |
| 3,340,106 | 9/1967 | Ballass et al. | 148/26 |
| 3,421,570 | 1/1969 | Guntermann | 148/26 X |
| 3,424,626 | 1/1969 | Coless et al. | 148/26 |
| 3,501,354 | 3/1970 | De Long | 148/26 X |
| 3,589,951 | 6/1971 | Arikawa et al. | 148/26 X |
| 3,645,782 | 2/1972 | Johnson | 148/26 X |
| 3,692,590 | 9/1972 | Godai et al. | 148/26 X |
| 3,798,078 | 3/1974 | Lettner et al. | 148/26 |

Primary Examiner—Allen B. Curtis
Assistant Examiner—Thomas A. Waltz
Attorney, Agent, or Firm—Wenderoth, Lind & Ponack

[57] ABSTRACT

A flux particularly adapted to the carrying out of a method for a build-up welding proposed by the present applicant essentially comprises, by weight, 50 to 90% of calcium fluoride and 10 to 40% of alumina with an addition of one or more compounds selected from the group consisting of 0.5 to 7% of iron oxide, 2 to 10% silica, 1 to 17% of manganese oxide and 2 to 10% of chrome oxide.

4 Claims, No Drawings

FLUX FOR A BUILD-UP WELDING

BACKGROUND OF THE INVENTION

The present invention relates to the flux for build-up welding, particularly suitable for "A Method for a Build-up Welding of Different Metals" for which a patent application has already been submitted by the same applicant of the present application under the same date.

As for the build-up welding of different metals, the band-like electrode submerged arc welding has hitherto been regarded as a superb welding method because it provides an excellently welded metal having less penetration with a high melting rate of electrode. However, A method for a build-up welding of different metals is still superior to the abovesaid conventional arc welding in all respects in that it provides a build-up-welded metal having a good yield of alloy elements with less penetration by using a thick and broad band-like electrode.

The embodiment of the invention according to the copending application abovementioned is proceeded with in the following manner: a flux powder is uniformly distributed over a horizontally disposed base metal to a substantially uniform thickness, and into the said flux, is continuously fed an electrode towards the base metal with an electric current applied therethrough. The flux between the free end of the electrode and the base metal is melted by an arc generated therebetween, and, once the flux has been melted, the arc disappears so that the melted flux is heated by the electric current supplied therethrough to such a high temperature as to melt both the electrode and the base metal, so the droplets of the electrode fall onto the melted base metal to form a deposit on it, thereby, upon movement of the electrode horizontally in the direction perpendicular to the width of the electrode, beads are formed on the base metal by the subsequent melting of the flux due to the Joule heat generated by an electric current flowing through the melted flux.

SUMMARY OF THE INVENTION

An object of the present invention is to provide a flux which is suitable for use in the method for the build-up welding of different metals according to the copending patent application as aforementioned.

A flux according to the present invention is characterized in that it mainly comprises of 50–90% by weight of calcium fluoride and 10–40% of alumina and not more than 20% of additives selected from one or more of compounds consisting of the group of 0.5–7.0% of iron oxide, 2–10% of silica, 1–17% of manganese oxide and 2–10% of chrome oxide.

DESCRIPTION OF THE PREFERRED EMBODIMENTS

Following is a detailed explanation of the chemical components of the flux according to the present invention and grounds for their respective ranges in weight %:

Calcium fluoride and alumina composing the main components of the flux according to the present invention are the indispensable elements for realizing one of the features of the abovesaid invention according to the copending patent application that an electric current is applied through the melted slag without generating an arc so that the melted slag melts both the electrode and the base metal to be build-up-welded by the Joule heat, thereby a convection of the melted slag is generated to make the droplets of the electrode become intimate with the melted base metal so that a fine smooth bead with less penetration is formed. In this case, if the content of calcium fluoride is above 90%, the electric conductivity of the melted slag becomes so high that a smooth bead is hard to obtain because of the shortage of Joule heat, on the contrary, if the content of calcium fluoride is below 50%, the electric conductivity becomes so low that an arc occurs.

As alumina is added to calcium fluoride, the electric conductivity becomes low so that the generation of heat due to Joule heat becomes large, but, if the content of alumina is less than 10%, a smooth bead is hard to obtain because of the small generation of heat, while, if the content of alumina is more than 40%, an arc occurs. Further, in embodying the method for a build-up welding according to the copending patent application as abovesaid, it is impossible to obtain a smooth, fine bead by a mere mixture of calcium fluoride and alumina combined in the abovesaid ratio, and it has been found to be indispensable that, when the stability of the welding operation and the detachability of the slag are taken into consideration, the following oxides should be added:

Iron oxide to improve the electric conductivity and fluidity of the melted slag and the intimacy of the melted base metal with the droplets of the electrode, adjust the straightness of the toes of the bead. However, such effects fail to show themselves if the content of iron oxide is below 0.5%; on the contrary, if its content is above 7%, the fluidity of the melted slag and the intimacy of the droplets with the melted base metal become too good to obtain a fine smooth bead, besides, the purity of the build-up metal deteriorates.

Silica to improve the appearance of the bead, adjust both toes of the bead and improve the detachability of the slag, but such effects are unobservable if its content is below 2%; whereas on the contrary, with the content above 10%, an undesired arc tends to occur.

Manganese oxide to not only improve the appearance of the bead and the detachability of the slag, but also to increase the yield of manganese in the electrode; however, with its content less than 1%, such effects are not displayed; whereas on the contrary, if it is more than 17%, the adjustment of the components of the build-up metal becomes difficult since the content of manganese becomes excessive in the build-up metal.

Chrome oxide to reduce the fluidity of the melted slag, adjust the shape of the bead and improve the appearance of the bead, but if its content is less than 2%, such effects are not observable; whereas on the contrary, if it is above 10%, the detachability of the slag deteriorates.

Further, by taking into consideration on the detachability of the slag, it is preferable to add zirconium oxide in the range below 5%.

The following examples of embodiment will serve to illustrate the invention, although it should be understood that these examples are not intended to limit the scope of the invention.

EXAMPLE 1 a. Flux:

After a mixture comprising 66% by weight of calcium fluoride, 27% of alumina, 2% of iron oxide and 5% of silica is melted together, it is ground into powder after it has solidified.

b. Chemical composition of the band-like electrode (thickness of 0.4 mm, width of 75 mm): 0.025% C, 0.65% Si, 1.69% Mn, 9.9% Ni, 18.8% Cr, balance Fe.

c. Chemical composition of the base metal: 0.12% C, 0.29% Si, 1.38% Mn, 0.11% Ni, 0.25% Cr, balance Fe.

d. Welding conditions:

Using an welding condition of 1,400 A(DCRP), 22 V, 120 mm/min. DC-constant voltage characteristics, one-layer, build-up Welding was performed for austenite stainless steel (corresponding to the Japanese Industrial Standard: JIS 304); a beautiful, smooth bead, a build-up thickness of 5.5 to 6 mm, was obtained.

The chemical composition of the build-up-welded metal is shown in Table 1.

Table 1

Chemical composition of the build-up-welded metal in Example 1(%)

| C | Si | Mn | Ni | Cr | Fe |
|---|---|---|---|---|---|
| 0.027 | 0.29 | 1.38 | 9.8 | 18.5 | Balance |

EXAMPLE 2 a. Flux:

After a mixture comprising, 64% by weight of calcium fluoride, 17% of alumina, 5% of iron oxide, 4% of silica, 3% of manganese oxide, 5% of chrome oxide and 2% of zirconium oxide is melted together, it is ground into powder after it has solidified.

b. Chemical composition of the band-like electrode (having a thickness of 1 mm and a width of 75 mm): 0.025% C, 0.19% Si, 1.78% Mn, 10.9% Ni, 20.5% Cr, 0.98% Nb, 0.08% Mo, balance Fe.

c. Chemical composition of the base metal: 0.14% C, 0.21% Si, 0.54% Mn, 0.10% Ni, 2.45% Cr, 0.90% Mo, balance Fe.

d. Welding conditions:

Under an electric current of 1,400 A (DCRP) and voltage of 22 V, using a direct current electric source having a constant voltage characteristic, at the speed of 120 mm/min, one layer of the austenite stainless steel (corresponding to the Japanese Industrial Standard: JIS 347) was build-up-welded, a beautiful, smooth bead of the build-up-welded metal having a thickness of 5–6 mm being obtained.

The chemical composition of the build-up-welded metal is shown in Table 2.

Table 2

Chemical composition of the build-up-welded metal in Example 2(%)

| C | Si | Mn | Ni | Cr | Nb | Mo | Fe |
|---|---|---|---|---|---|---|---|
| 0.035 | 0.40 | 1.95 | 10.1 | 19.5 | 0.88 | 0.14 | balance |

EXAMPLE 3 a. Flux:

After a mixture comprising 55% by weight of calcium fluoride, 30% of alumina, 2% of iron oxide, 5% of silica, 5% of manganese oxide and 3% of zirconium oxide is melted together, it is ground into powder after it has solidified.

b. Chemical composition of the band-like electrode (having a thickness of 0.4 mm and a width of 50 mm): 0.06% C, 0.35% Si, 0.40% Mn, 0.10% Ni, 14.0% Cr, balance Fe.

c. Chemical composition of the base metal: 0.20% C, 0.23% Si, 0.72% Mn, 0.13% Ni, 0.07% Cr, balance Fe.

d. Welding conditions:

Under an electric current of 900 A (DCRP) and voltage of 28 V using a direct current electric source having a constant voltage characteristic, at the speed of 120 mm/min, one layer of a martensite base stainless steel (corresponding to the Japanese Industrial Standard: JIS 410) was build-up-welded, a beautiful, smooth bead of the build-up-welded metal having a thickness of 4.5–5.5 mm being obtained.

The chemical composition of the build-up-welded metal is given in Table 3.

Table 3

Chemical composition of the build-up-welded metal(%)

| C | Si | Mn | Ni | Cr | Fe |
|---|---|---|---|---|---|
| 0.06 | 0.30 | 0.95 | 0.12 | 12.8 | balance |

What is claimed is:

1. A flux for build-up horizontal electroslag welding, consisting of a flux prepared by fusing together 50–90% by weight of calcium fluoride, 10 to 40% by weight of alumina and an effective amount up to 20% by weight of one or more compounds selected from the group consisting of 0.5 to 7% by weight of an iron oxide 2 to 10% by weight of silica, 1 to 17% by weight of manganese oxide and 2 to 10% by weight of chrome oxide, and 0 to 5% by weight of zirconium dioxide.

2. A flux for build-up horizontal slag welding according to claim 1, wherein the flux is prepared by fusing a mixture consisting of 66% by weight of calcium fluoride, 27% by weight of alumina, 2% by weight of iron oxide and 5% by weight of silica.

3. A flux for build-up horizontal slag welding according to claim 1, prepared by fusing a mixture consisting of 64% by weight of calcium fluoride, 17% by weight of alumina, 5% by weight of iron oxide, 4% by weight of silica, 3% by weight of manganese oxide, 5% by weight of chrome oxide and 2% by weight of zirconium oxide.

4. A flux for build-up horizontal slag welding according to claim 1, prepared by fusing a mixture consisting of 55% by weight of calcium fluoride, 30% by weight of alumina, 2% by weight of iron oxide, 5% by weight of silica, 5% by weight of manganese oxide and 3% by weight of zirconium oxide.

* * * * *